(12) United States Patent
McFarland (10) Patent No.: US 7,210,889 B2
(45) Date of Patent: May 1, 2007

(54) CIRCULATING STORAGE SYSTEM

(75) Inventor: John McFarland, Gainsborough Crescent (GB)

(73) Assignee: Bellheimer Metallwerk GmbH, Bellheim (DE)

(*) Notice: Subject to any disclaimer, the term of this patent is extended or adjusted under 35 U.S.C. 154(b) by 172 days.

(21) Appl. No.: 10/319,964

(22) Filed: Dec. 16, 2002

(65) Prior Publication Data

US 2003/0118428 A1 Jun. 26, 2003

(30) Foreign Application Priority Data

Dec. 21, 2001 (DE) ................. 101 64 594

(51) Int. Cl.
*B65G 1/12* (2006.01)

(52) U.S. Cl. ................. 414/331.02; 198/465.3; 414/791

(58) Field of Classification Search ........ 414/331.02, 414/331.04, 331.14, 788.9, 791, 267; 198/465.3, 198/795, 863.2
See application file for complete search history.

(56) References Cited

U.S. PATENT DOCUMENTS

| | | | | | |
|---|---|---|---|---|---|
| 699,133 | A | * | 5/1902 | Allis .................. | 198/626.5 |
| 2,600,869 | A | | 6/1952 | Harkness et al. | |
| 2,762,489 | A | | 9/1956 | O'Sullivan | |
| 4,014,428 | A | * | 3/1977 | Ossbahr ............... | 198/345.3 |
| 4,134,758 | A | * | 1/1979 | Nagai et al. .......... | 148/421 |
| 4,545,714 | A | * | 10/1985 | Johnson et al. ........ | 414/788.2 |
| 4,601,386 | A | | 7/1986 | Antonello | |
| 5,085,059 | A | * | 2/1992 | Grigoli et al. ......... | 62/345 |
| 5,108,163 | A | | 4/1992 | Nakatsu | |
| 5,125,782 | A | * | 6/1992 | Goldschmidt et al. ... | 414/276 |
| 5,135,344 | A | * | 8/1992 | Kita et al. ............ | 414/273 |
| 5,176,245 | A | * | 1/1993 | Sekitani ............... | 198/465.2 |
| 5,425,612 | A | * | 6/1995 | Ebstein ................. | 414/254 |
| 5,496,000 | A | * | 3/1996 | Mueller ................ | 244/118.1 |
| 5,567,104 | A | * | 10/1996 | Focke et al. .......... | 414/331.01 |
| 5,636,722 | A | * | 6/1997 | Koop .................. | 198/347.1 |
| 5,921,739 | A | | 7/1999 | Keip et al. | |

FOREIGN PATENT DOCUMENTS

| | | |
|---|---|---|
| CH | 678940 | 11/1991 |
| DE | 370578 | 3/1923 |
| DE | 1173027 | 6/1964 |
| DE | 1929890 | 12/1970 |
| DE | 2441095 | 3/1975 |
| FR | 2132575 | 11/1972 |
| GB | 2078651 | 1/1982 |
| WO | 0138203 | 5/2001 |

* cited by examiner

OTHER PUBLICATIONS

Patent Abstracts of Japan—Bd. 012, Nr.325 (M-737), Sep. 5, 1988 and JP 63 092510 A—(NEC Home Electronics LTD), Apr. 23, 1988.

*Primary Examiner*—Charles A. Fox
(74) *Attorney, Agent, or Firm*—Mark P. Stone (57) ABSTRACT

A circulating storage system (1) has at least two storage columns (4) of stored-goods carriers (5) that are arranged one above another and circulate during operation, at least one horizontal conveyor device (9) which, during operation, transfers the stored-goods carriers from one storage column to the other storage column, and a vertical conveyor device (7) which, during operation, can move at least one part of the storage column in a vertical direction. The circulating storage system also has at least one further vertical conveyor device (7), for each vertical conveyor device assigned to a storage column, to provide each storage column with the capability of being moved in the vertical direction, independently of the other storage column, by the vertical conveyor device assigned to it.

42 Claims, 8 Drawing Sheets

CIRCULATING STORAGE SYSTEM

The invention relates to a circulating storage system comprising at least two storage columns with stored-goods carriers that are arranged one above another and circulate during operation, comprising at least one horizontal conveyor device by means of which, during operation, the stored-goods carriers can be transferred from one storage column to the other storage column, and comprising a vertical conveyor device by means of which, during operation, at least part of the storage column can be moved in the vertical direction.

Circulating storage systems are known from the prior art.

For example, U.S. Pat. No. 2,600,869 shows and describes a circulating storage system in which the stored goods are stored in stored-goods carriers. The stored-goods carriers are in each case combined in pairs and in each case suspended on the sections running vertically and belonging to a single circulating endless chain, so that two storage columns are formed. At the upper and lower end of the storage columns, the stored-goods carriers are transferred from one storage column to the other during circulation.

U.S. Pat. No. 5,108,163 likewise shows and describes a circulating storage system on the paternoster principle, in which the stored-goods carriers in this circulating storage system are suspended into the sections running vertically and belonging to two endless chains fitted on both sides of the stored-goods carriers, so that two storage columns are formed in this apparatus as well. At the upper and lower end of each storage column, the stored-goods carriers are transferred from one storage column to the other storage column of the conveyor chains.

In the circulating storage system of WO 01/38203, which is based on the circulating storage systems of U.S. Pat. No. 2,600,869 and U.S. Pat. No. 5,108,163 as prior art, improvements were made only with regard to the configuration of those apparatuses by which the stored-goods carriers were transferred from one storage column to the other.

U.S. Pat. No. 4,601,386 describes a circulating storage rack comprising two storage columns which are raised or lowered by means of vertical worm drives. Between the two storage columns, the objects to be put into store are conveyed by means of horizontally movable carriages above and below the storage columns. The vertically conveying worm mechanisms and the horizontally operating carriages are forcibly coupled to each other by means of a Maltese-cross mechanism.

In the storage arrangement of DE-B 1 173 027, frameworks for accommodating objects to be put into store are moved in the vertical direction and opposite to one another by a common drive apparatus. The movement of the storage columns is forcibly intercoupled by means of a gearwheel drive.

U.S. Pat. No. 2,762,489 describes an apparatus for transporting and storing goods. The containers are mounted in two vertical storage columns, which can each be moved by a lifting cylinder. Two horizontally conveying devices in the form of an electrically driven carriage in each case transport the containers between the two storage columns. The movements of the horizontal carriages and of the storage columns are synchronized by means of levers, which are actuated by the carriages during their movement.

In these circulating storage systems from the prior art, an expansion of the storage capacity is possible only by lengthening the endless chains and therefore the storage columns. However, this presupposes that there are specific spatial conditions, for example adequate room height, at the place where they are erected.

DE-C 370 578 describes a drying system comprising chambers which are located one behind another, the material to be dried being guided through the chambers in a rising and falling manner. The chambers are connected to one another by conveyor means running above and below the chambers. In each chamber, the material to be dried is transported by conveyor chains, the conveyor chains of all the drying chambers being permanently coupled to a common drive.

CH 678 940 A5 describes a storage system which comprises a high-rack storage area having a large number of inclined storage conveyors of identical height operating on the paternoster principle. The inclined storage conveyors located one behind another are loaded by means of horizontal conveyors fitted above and below the paternosters. In the apparatuses of DE-C 307 578 and CH 678 940 A5, it is disadvantageous that the material to be stored has to be loaded awkwardly into the individual paternosters.

In all the circulating storage systems described above, it is disadvantageous that, in the case of high storage capacities, access to the stored-goods carriers, for example to remove stored goods or to put them into store, takes a disproportionately long time. These known circulating storage systems therefore cannot be used in modern fully automatic production lines, where operations are carried out at high cycle rates and rapid access to the stored goods stored in the storage system must take place.

In view of these disadvantages, the present invention is based on the object of providing a circulating storage system in which the storage capacity can be expanded easily without the access speed to the stored goods being reduced excessively in the case of large storage capacities.

According to the invention, for a circulating storage system of the type mentioned at the beginning, this object is achieved by at least one further vertical conveyor device being provided, by each vertical conveyor device being assigned to a storage column, and by the fact that each storage column can be moved in the vertical direction, independently of the other storage column, by the vertical conveyor device assigned to it.

This solution is simple and has the advantage that, as a result of the assignment of further vertical conveyor devices to the respective storage columns, the storage system can be expanded at any time by adding further storage columns with the associated vertical conveyor devices. The solution according to the invention therefore permits a modular design.

In the solution according to the invention, even with high storage capacities, rapid access to the stored-goods carriers is possible, since each storage column is independently driven such that it can move vertically by the vertical conveyor device associated with it. As a result of this independence of the vertical conveyance of the stored-goods carriers, the rigid geometry of the circulation paths of the stored-goods carriers, which is firmly predefined in the case of the known circulating storage systems, can be given up in favor of flexible adaptation of the circulation paths. For example, in the case of more than two storage columns in the circulating storage system, any desired circulation routes can be followed by a stored-goods carrier, so that it can be transported on the shortest route to a location at which access can be made to it. Such a location can be, for example, an access or fitting and removal opening or a platform. In order to optimize the circulation, the vertical conveyor devices and the horizontal conveyor devices act together, so that the stored-goods carriers are transported to the access opening on the quickest route.

The expenditure on construction for the horizontal conveyor devices can be reduced if, according to an advantageous refinement of the invention, the stored-goods carriers of a storage column are supported on a lower stored-goods carrier which is in engagement with the vertical conveyor device. In this refinement, the entire storage column is moved only by means of its respectively lower stored-goods carrier, while the other stored-goods carriers merely rest on the lower stored-goods carrier. This has the advantage that the storage capacity can be changed merely by changing the stacking height of the storage columns, without any rebuilding measures on the vertical conveyor devices.

The independent conveyance of the stored-goods carriers, firstly by the vertical conveyor devices and secondly by the horizontal conveyor devices, requires synchronization of the conveyor devices, in order to transfer the stored-goods carriers safely from one conveyor device to the next during the circulation. The synchronization can be provided in a mechanical way by means of intercoupled conveyor devices or in an electronic way by a control unit.

Even in the case of heavy loading, the individual stored-goods carriers have to be coupled safely into the vertical conveyor device and held by the vertical conveyor device. For this purpose, the vertical conveyor device can comprise a flexible drive mechanism, for example a V-belt mechanism, a belt mechanism or a chain drive, with which the stored-goods carriers can be brought detachably into engagement during the circulation. The conveyor devices can in each case be arranged on both sides of the stored-goods carriers.

In order also to be able to convey heavy loads, according to the invention in a further refinement, provision can be made for the vertical conveyor device to comprise two flexible drive mechanisms running in opposite directions on at least one side of the storage columns. In this refinement, the weight of the storage column is distributed to two flexible drives, so that even heavy loads can be put into store. If the flexible drives used are chains or toothed belts, then, according to a development of the invention, for example a rack fitted to the stored-goods carrier can be used for the purpose of coupling into the flexible drive mechanism. Depending on the number of flexible drive mechanisms, the rack can be toothed on one side or many sides.

In an advantageous refinement, the vertical conveyor device can be arranged in the lower region of the storage column. This arrangement is easy to maintain, since the vertical conveyor device is more easily accessible to maintenance personnel in the lower region of the storage system. Furthermore, the arrangement of the vertical conveyor device in the lower region of the storage system is advantageous in combination with the refinement in which in each case the lowest stored-goods carrier, together with the entire storage column resting thereon, is raised or lowered by the vertical conveyor device.

In the case of more than two storage columns, in order to optimize the circulation of the stored-goods carrier to which access presently has to be made, with regard to the access speed, it is advantageous if the horizontal conveyor devices can also be operated independently of one another. For example, separately controllable horizontal conveyor devices can be provided in each case at the upper and at the lower end of a storage column. In this refinement, it is possible to transport a stored-goods carrier along a plurality of horizontal conveyor devices connected one behind another past individual storage columns. The horizontal conveyor device can likewise have a flexible drive mechanism.

In order to increase the capability of the circulating storage system according to the invention to be expanded, the horizontal conveyor device can be equipped as a module substantially ready to be installed. In a development, in this case a single drive can be assigned to all the modules. In this refinement, the drive power can then be transmitted from module to module via standardized coupling elements.

One constructionally simple solution to transporting the stored-goods carriers from one storage column to the next, according to a further advantageous refinement, consists in the horizontal conveyor device comprising a sliding rail that extends substantially in the horizontal direction and on which a sliding section of the stored-goods carriers is supported in a sliding manner when being transported from one storage column to the other. The sliding rail can cooperate with the stored-goods carriers in such a way that removal of the stored-goods carrier from the horizontal conveyor device is possible only at specific positions. This can be implemented, for example, by means of an appropriate arrangement of projections and recesses on the sliding rail and on the stored-goods carriers.

In order to set down the stored-goods carriers onto the upper end of a storage column from above from the horizontal conveyor device, or to bring them up to the storage column from below, so that they take over the weight of the storage column, according to a further advantageous refinement, at least one transfer device can be provided for each storage column. The transfer device can be arranged between the horizontal conveyor device assigned to this storage column and the vertical conveyor device of this storage column.

In order to transfer the stored-goods carriers from the horizontal conveyor device to the vertical conveyor device, the transfer device initially accelerates the stored-goods carriers in the vertical direction away from the horizontal conveyor device, so that the stored-goods carrier approaches the storage column. The vertical speed of the stored-goods carrier is then reduced and the stored-goods carriers are docked with the storage column.

In the opposite conveying direction from the vertical conveyor device to the horizontal conveyor device, the vertical speed of the conveyor section is initially increased by the transfer device, starting from the vertical speed of the vertical conveyor device, so that the stored-goods carrier is released from the storage column and then, when the horizontal conveyor device has been reached, said speed is reduced to zero, so that the stored-goods carrier can couple into the horizontal conveyor device.

This movement sequence can be achieved either by means of an electronic drive control system or—in a mechanical way—by means of a cam drive. In one refinement, the cam drive can comprise a flexible drive mechanism.

The invention also relates to a construction set for a circulating storage system according to one of the above refinements, the construction set comprising a plurality of storage column modules and horizontal conveyor devices. The storage column modules are constructed substantially identically and can be attached to one another, so that the storage capacity can be increased by simply adding further storage columns. In this case, each storage column module has its own independent vertical conveyor device. By means of the horizontal conveyor devices, the individual storage columns are connected to one another and the circulation of the stored-goods carriers is made possible. In particular, the conveyor device overall can be constructed as installation modules which can be mounted into the circulating storage system as devices.

Furthermore, the invention relates to a method of managing a circulating storage system comprising a plurality of stored-goods carriers arranged in storage columns, in which one of the stored-goods carriers is brought from a storage column into a predetermined access position by the stored-goods carriers circulating and, in the process, being transferred from one storage column to another storage column.

The capability according to the invention of expanding the storage capacity and increasing the access speed to individual stored-goods carriers is achieved in that, according to the invention, in the method the storage columns are moved in the vertical direction independently of one another.

In the following text, the invention will be explained in more detail using an exemplary embodiment with reference to the drawings, in which.

First of all, the construction of a circulating storage system according to the invention will be described with reference to FIG. 1. In the following text, in the case of a plurality of identical elements, the individual elements are identified with letters in addition to the reference number, in order to distinguish the individual elements from one another. If the following description does not concern the individual element as such, these letters are left out.

Figure 1:
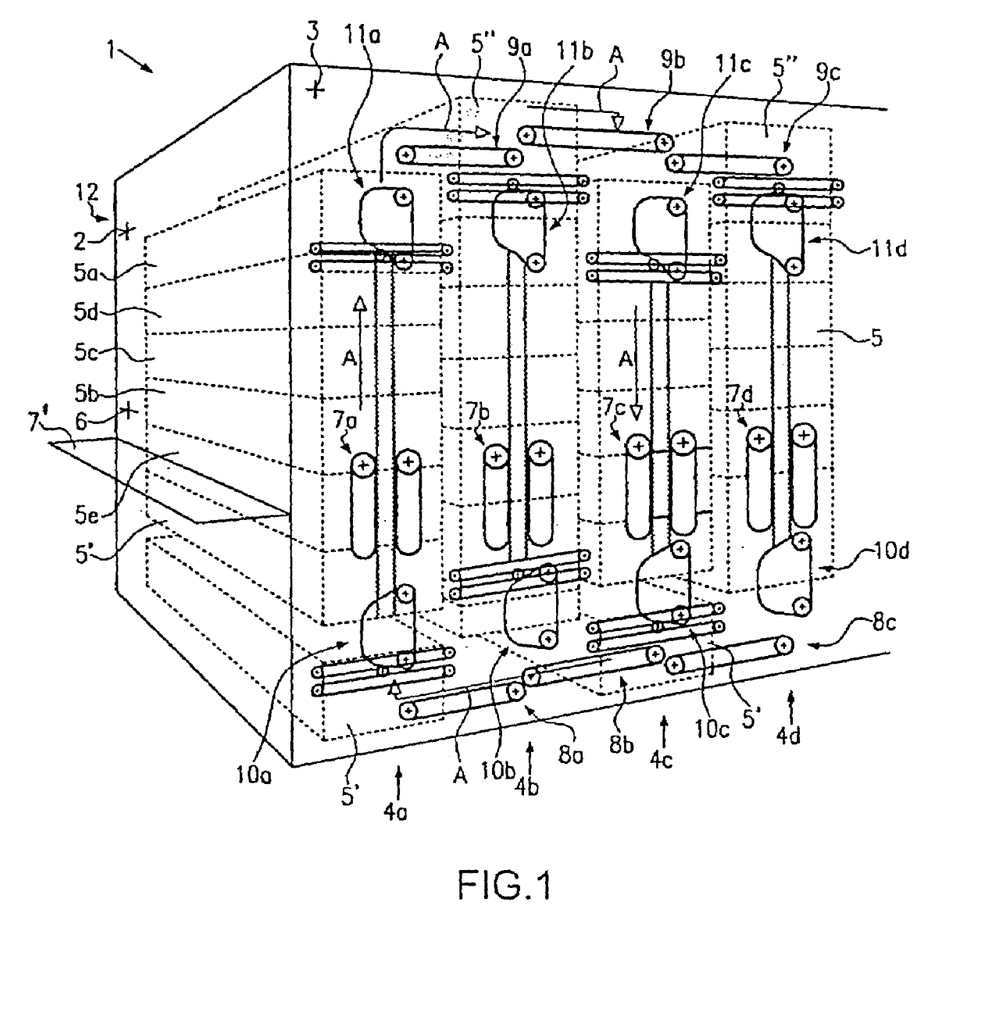
FIG. 1 shows a perspective illustration of a circulating storage system according to the invention, the side walls of the circulating storage system being shown as transparent.

FIG. 1 shows a perspective view of a circulating storage system 1, the front side 2 of the storage system and one side wall 3 being illustrated as transparent.

A circulating storage system of the type illustrated in FIG. 1 has a plurality of storage columns 4a, 4b, 4c, 4d . . . comprising stored-goods carriers 5a to 5e arranged one above another.

The circulating storage system of FIG. 1 also has an access opening 6, via which stored goods can be removed from the stored-goods carriers 5 or stored goods can be stored in the stored-goods carriers 5.

A platform 7', on which stored goods can be deposited for simple handling, can be arranged in front of the access opening 6.

The storage columns 4 extend parallel to the access opening 6 and are stacked one behind another in the direction away from the access opening 6 and parallel to one another. In the exemplary embodiment of FIG. 1, four storage columns 4a, 4b, 4c, 4d are shown by way of example, but any desired number of storage columns, but at least two, can be provided.

On its opposite sides, each storage column 4a . . . d in each case has a vertical conveyor device 7a . . . d. By means of the vertical conveyor devices 7, the stored-goods carriers 5 in the respective storage column 4 are moved upward or downward in the vertical direction.

In order to convey the stored-goods carriers from one storage column to the other in the horizontal direction, lower horizontal conveyor devices 8a . . . c are provided at the lower end of the storage columns. In a similar way, upper horizontal conveyor devices 9a . . . c are provided at the upper end of the storage columns 4. The horizontal conveyor devices 8, 9 bridge the storage columns in the horizontal direction and, starting from the first storage column 4a located at the access opening, extend from one storage column in each case to the adjacent storage column located behind it. FIG. 1 illustrates how the stored-goods carrier 5' at the lower end and the stored-goods carriers 5" at the upper end of the storage columns 4 are just being transported between the storage columns 4 by the horizontal conveyor devices.

Furthermore, between the vertical conveyor devices 7 of each storage column 4 and the horizontal conveyor devices 8, 9 associated with this storage column, in each case lower 10a . . . d and upper 11a . . . d transfer devices are provided. The lower transfer devices 10a . . . d are used to pick up the stored-goods carriers 5' from the lower horizontal conveyor devices 8a . . . c, to accelerate them in the vertical direction and to bring them up from below to the lowest stored-goods carrier 5a and couple them to the storage column 4, if the storage column 4 moves upward.

On the other hand, if the storage column 4 moves downward, then the lower transfer device 10 removes the lowest stored-goods carrier, accelerates it downward in the vertical direction so that it detaches from the respective storage column 4, and then brakes the stored-goods carrier, so that it can be picked up by the lower horizontal conveyor device 8 associated with this storage column 4 and can be transported away in the horizontal direction. This is illustrated schematically in FIG. 2, in which the direction of movement of the storage column is indicated by the double arrow A.

Figure 2:
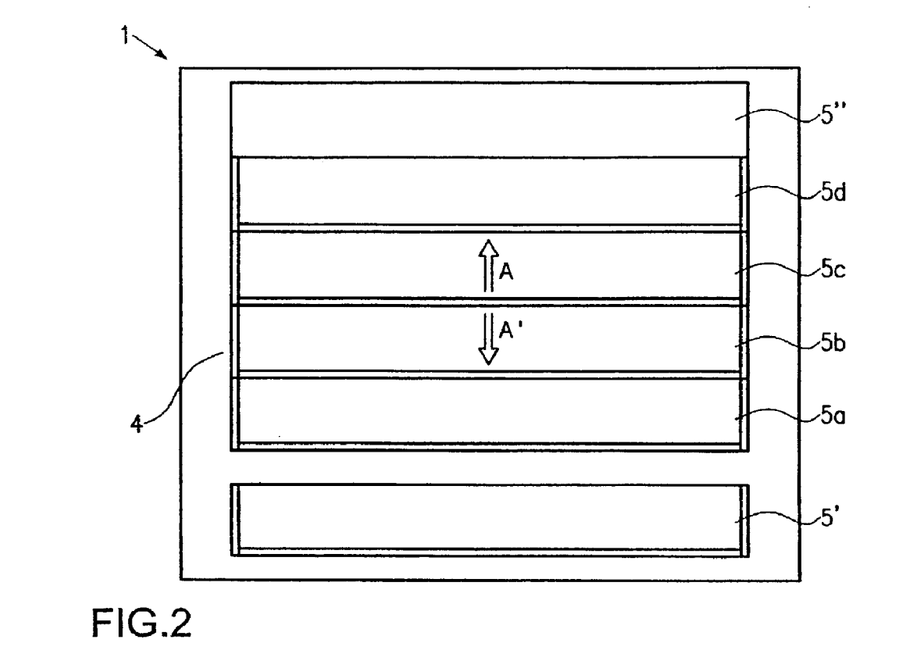
FIG. 2 shows a schematic front view of the circulating storage system from FIG. 1.

The upper transfer devices 11 function in a similar way: if the storage column moves upward, then the upper transfer devices in each case grip the top stored-goods carrier 5e and accelerate it in the upward direction, so that it detaches from the respective storage column 4. The stored-goods carrier 5e is then braked to a vertical speed of zero or close to zero, so that it can be gripped by the upper horizontal device 19 assigned to this storage column 4 and can be transported away from this storage column in the horizontal direction.

If the storage column 4 moves downward, the upper transfer device grips a stored-goods carrier 5" supplied by the horizontal conveyor device 9, accelerates it downward in the vertical direction and places it on the top of the storage column 4.

As a result of the synchronized interplay of the conveyor devices 7, 8, 9, 10 and 11, circulation of the stored-goods carriers 5 in the circulating storage system 1 is achieved, it being possible for any desired storage columns 4 to be involved in this circulation. Such a circulation is illustrated by way of example by the arrow A in FIG. 1.

Figure 3:
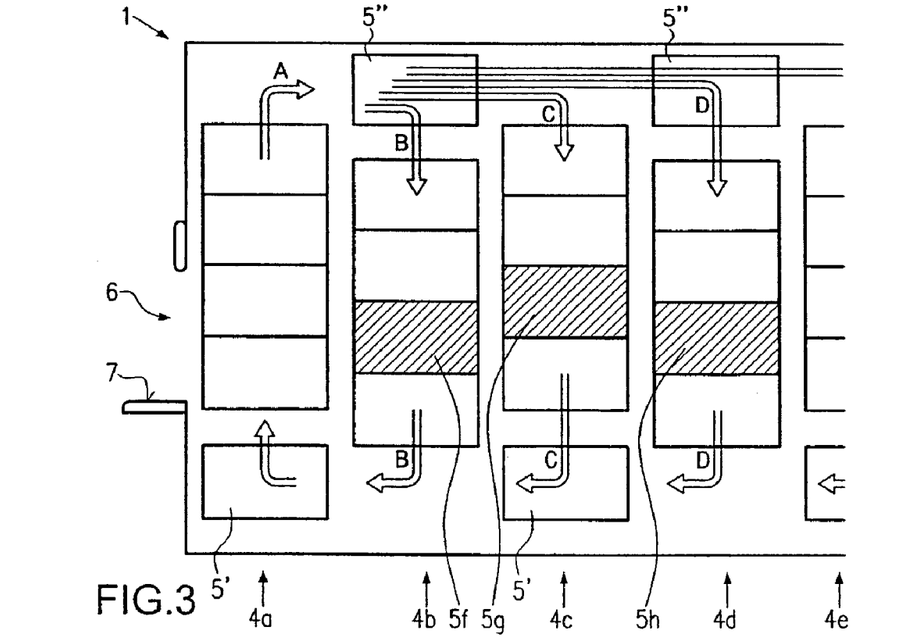
FIG. 3 shows a schematic side view of the circulating storage system from FIG. 1 to explain the circulation paths of stored-goods carriers.

Various circulation paths of the stored-goods carriers are represented schematically by the arrows A, B, C, D and E in FIG. 3. In this case, it should be noted that the direction of circulation can also readily be reversed.

The storage column facing the access opening 6 can be brought to a standstill, and only two of the rear storage columns can be operated, so that the stored-goods carrier to be removed next can be brought into the vicinity of the access opening 6.

Thus, for example, a circulation of the stored-goods carriers through the storage columns 4a, 4b in accordance with the arrows A, B can be achieved, as in a paternoster system. During the circulation through the storage columns 4a and 4b, the remaining storage columns 4c, 4d, 4e can be at rest or else carry out a parallel circulation at the same time, in order already to bring stored-goods carriers into position for the next access to the stored goods.

By means of the circulation according to the arrows A, B, a stored-goods carrier 5f arranged in the storage column 4b can be conveyed into the area of the access opening 6.

On the other hand, if a stored-goods carrier 5g in the storage column 4c is to be transported to the access opening 6, then a circulation takes place along the arrows A, C with the storage column 4b at a standstill. In this way, the stored-goods carrier 5g can be conveyed quickly to the access opening 6.

In a similar way, with the storage columns 4b and 4c at a standstill, the stored-goods carrier 5h in the storage column 4d can be transported quickly to the access opening 6 along the arrow combination A, D.

As a result of assigning the vertical conveyor devices 7 and the transfer devices 10, 11 to one storage column in each case, each storage column 4 together with the vertical conveyor devices 7 and the two transfer devices 10, 11 forms a storage column module, so that the circulating storage system can be expanded modularly to the necessary capacities by lining up any desired number of storage column modules. The storage column modules are bridged by the horizontal conveyor devices 8, 9 and permit the stored-goods carriers 5 to circulate through the circulating storage system.

In the exemplary embodiment of FIG. 1, the stored-goods carriers 5 in a storage column 4 are stacked on each other and are supported with their weight on the respective lower stored-goods carrier 5a. By means of this principle, the height of the storage column 4 can be changed simply by lengthening the stacking height, without any rebuilding measures on the conveyor devices 7, 8, 9, 10, 11. The distance between the vertical conveyor device 7 arranged in the lower area of the circulating storage system 1, and the respective upper transfer device 11, is arbitrary and can be matched to the respective requirements.

With regard to FIG. 1, it should finally be noted that the conveyor devices 7, 8, 9, 10, 11 are arranged identically on both sides 3, 12 of the circulating storage system.

Figure 4:
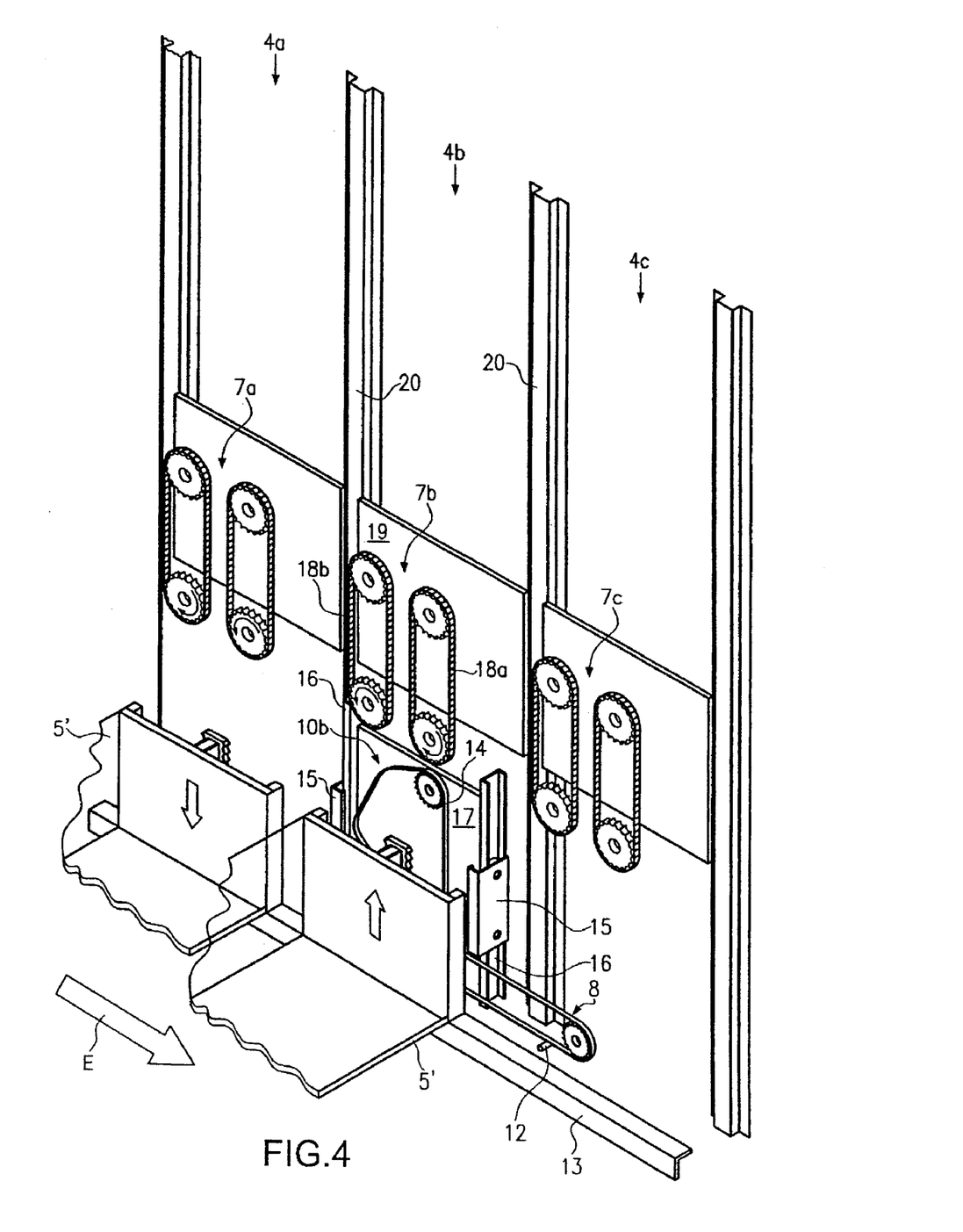
FIG. 4 shows a perspective view of a detail of the circulating storage system from FIG. 1, stored-goods carrier, vertical conveyor device and a transfer device and also part of a horizontal conveyor device being illustrated.

FIG. 4 shows a detail of a lower section of the circulating storage system 1 from FIG. 1 in a perspective view. For reasons of clarity, in the storage columns 4a and 4c of FIG. 4, the lower transfer devices 10 have been left out. In addition, the stored-goods carriers 5 in the individual storage columns are not shown. The illustration of FIG. 4 makes the arrangement and the interaction of the conveyor devices 7, 8, 10 in the lower area of the circulating storage system 1 clear.

The two stored-goods carriers 5' are transported in the direction of the arrow E by the lower horizontal conveyor device 8, constructed as a flexible drive mechanism. In the exemplary embodiment of FIG. 4, the lower horizontal conveyor device 8 is provided with a chain drive; it can alternatively also comprise a belt drive with a V belt or a toothed belt.

The horizontal conveyor device 8 has a driver 12, by means of which the stored-goods carriers 5' are conveyed from one storage column to the next along a sliding rail 13.

The lower transfer device 10b has a flexible drive mechanism 14 and two vertically movable carriages 15, which are driven by the flexible drive mechanism 14 (not shown in FIG. 4) and are guided in the vertical direction by guide rails 16 on both sides of the transfer device. The guide rails 16 are used at the same time as supports for the entire transfer device 10. Fitted between the guide rails is a mounting plate 17, on which the flexible drive mechanism 14 and its drive (not shown) are fitted. The transfer device 10 thus forms a device which can be mounted separately, with the guide rails 16 and the plate 17 as a frame.

The vertical conveyor devices 7 comprise two flexible drive mechanisms 18a and 18b which are driven in opposite directions and are arranged beside each other on a mounting plate 19. The mounting plate 19 extends between two vertical pillars 20, which form the framework of the circulating storage system 1. The maximum height of the storage column is defined by the length of the pillars 20.

By using FIG. 4, it is easy to see that the circulating storage system can be expanded by one storage column by adding further pillars 20, upper and lower transfer devices 10, 11, a vertical conveyor device 17 and upper and lower horizontal conveyor devices 8, 9.

Figure 5:
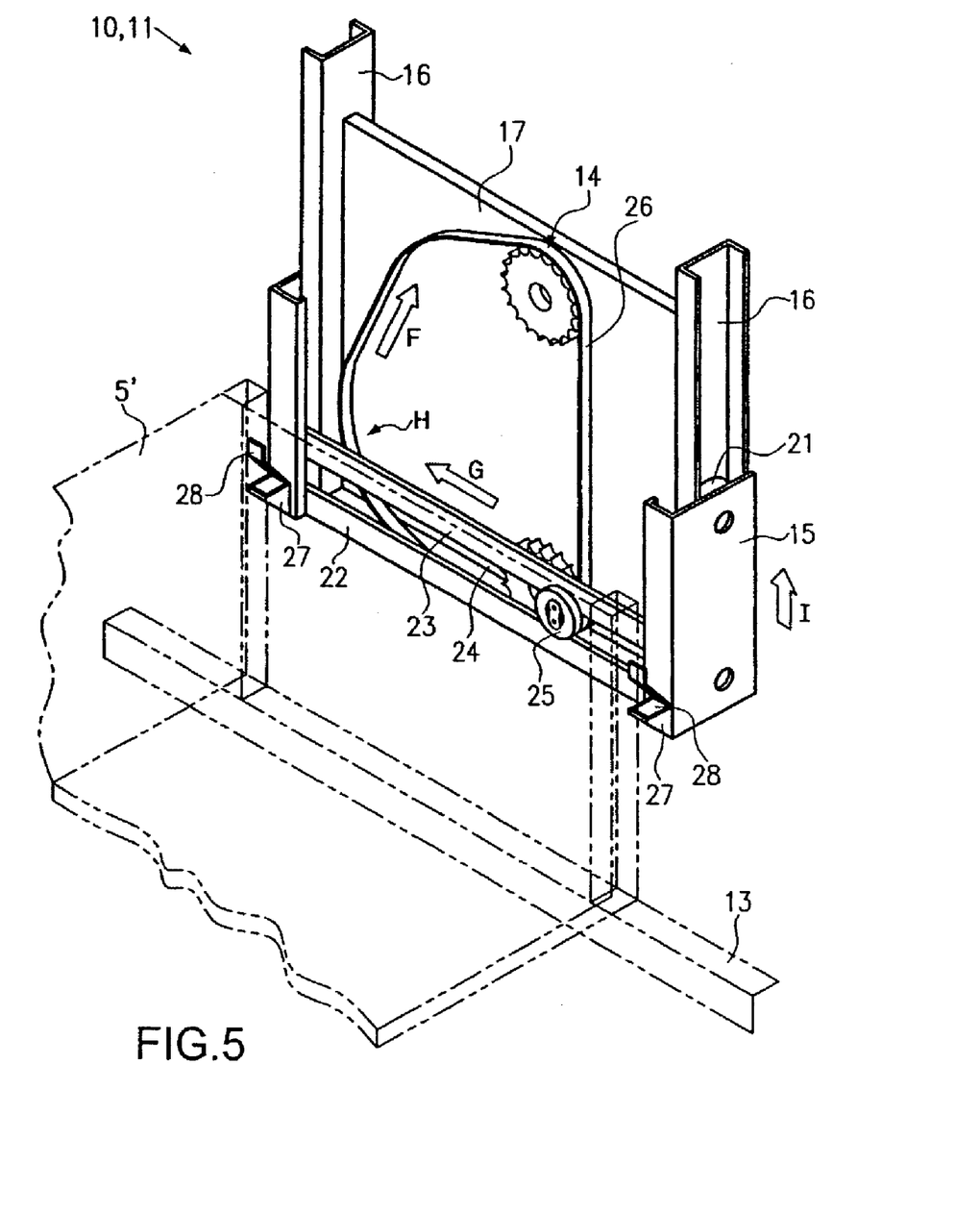
FIG. 5 shows a detail from FIG. 4 in a perspective view, a transfer device being illustrated.

Now, by using FIG. 5, the construction of a transfer device 10, 11 will be explained. FIG. 5 represents a detail from FIG. 4 in a perspective view.

For reasons of simplicity, only one transfer device 10, 11 and parts of a stored-goods carrier 5' and of a sliding rail 13 are shown in FIG. 5. The lower horizontal conveyor device 8 has been left out. For the components already known from FIG. 4, the same reference symbols are used in FIG. 5.

It can be seen in FIG. 5 that the carriage 15 is guided by rollers 21 along the substantially U-shaped guide rails 16. The carriages 15 on one side of the stored-goods carriers are connected to one another by two struts 22, 23 which run substantially horizontally and are spaced apart from each other. Formed between the two struts 22, 23 is a substantially slot-like interspace 24, in which a rolling element 25 is guided such that it can move along the struts. The rolling element 25 is configured in the manner of a disk or roller and, for the purpose of stabilization, is provided with a circumferential groove, in which the struts 22, 23 engage. The rolling element 25 is connected to the flexible drive 26 of the flexible drive mechanism 14 of the transfer device 10, 11 and circulates with the flexible drive 26 in the direction of arrow F, moving the carriage 15 to and fro in the vertical direction.

The flexible drive mechanism 14, the rolling elements 25 on both sides and the carriages 15 form a type of cam drive, whose construction and function will be explained in more detail in the following text.

Starting from the position illustrated in FIG. 5, the rolling element 25 initially moves to the right in the direction of arrow E. As soon as the rolling element 25 comes into the area H of the flexible drive mechanism 14, it moves the carriage 15 upward via the struts 22, 23. The carriage 15 is provided with holding elements 27 having holding surfaces that point upward, on which the stored-goods carrier 5' rests on opposing holding elements 28. Via the engagement between the elements 27, 28, the stored-goods carrier 5' is raised during the upward movement of the carriage 15 along the arrow I.

In the vicinity of the top point during the circulating movement of the rolling element 25, the stored-goods carrier 5' is coupled into the vertical conveyor device and uncoupled from the transfer device. In the exemplary embodiment of FIG. 5, it is uncoupled from the transfer device as a result of the stored-goods carrier 5' being simply raised, whereupon the holding element 27 detaches from the opposing holding element 28.

The circulation path illustrated in FIG. 5 of the flexible drive 26 can be produced by means of deflection rollers at the deflection points of the flexible drive or by means of a guide groove. The various areas of the circulation path of the rolling element 25 are allocated various functions during the transfer of the stored-goods carriers. This will be explained in more detail in the following text with reference to FIG. 6.

Figure 6:
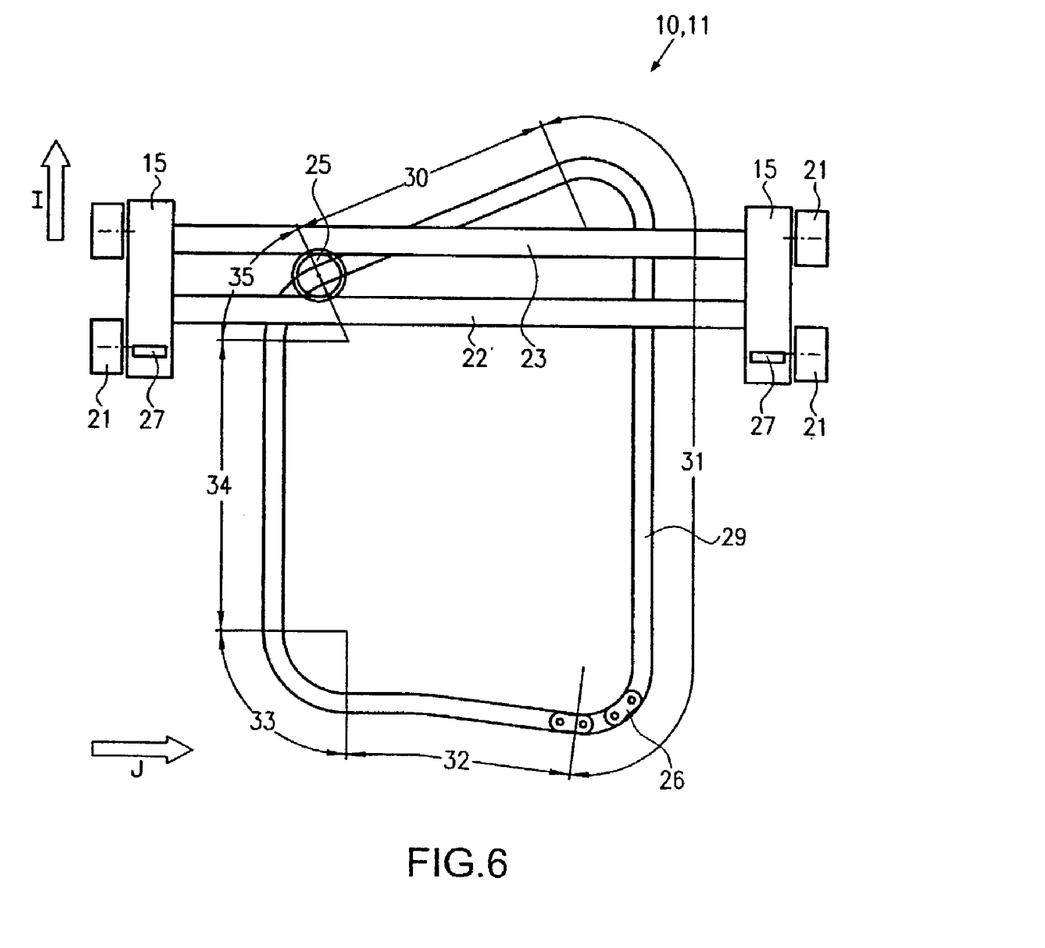
FIG. 6 shows a schematic sketch of the transfer device from FIG. 5 to explain the function.

In FIG. 6, the flexible drive used by way of example is a chain 26, which is guided on a predetermined circulation path in a guide groove 29. For identical elements, the reference symbols already known from FIGS. 1 to 5 are used in FIG. 6.

In FIG. 6, the rolling element 25 is shown in a position from which the circulation path of the flexible drive 26 runs in the direction of the vertical conveyor device over an area 30 which is inclined with respect to the vertical. In the area 30, the carriage 15 with the stored-goods carrier resting on the holding elements 27 is already close to the end of its stroke and is gradually being coupled into the vertical conveyor device (not shown). For this coupling operation, the vertical speed in the area 30 must correspond approximately to the vertical speed of the vertical conveyor device and is preferably slightly below this. With a given speed of circulation of the chain, the vertical speed of the rolling element 25 depends only on the angle of slope of the area 30. In the subsequent area 31, the carriages 15 are [lacuna] away from the vertical conveyor device at maximum vertical speed after transferring the stored-goods carriers to the vertical conveyor devices. In the area 31, therefore, the circulation path runs in the vertical direction. At the end of the area 31, the carriages 15 with the holding elements 27 are in a position in which the stored-goods carriers are picked up by the horizontal conveyor devices or discharged to the latter.

The carriages 15 remain in this vertical position while the rolling element 25 passes through an area 32. In the area 32, the circulation path runs virtually horizontally or inclined slightly with respect to the vertical conveyor device. At the start of the area 32, the holding elements 27 are at a distance underneath the opposing holding elements 28, so that, by means of the horizontal conveyor device, a new stored-goods carrier from the direction of the arrow J can be positioned with the opposing holding elements 28 above the holding elements 27. By means of raising the carriages slightly in the direction of the vertical conveyor device at the end of the area 32, holding elements 27 and opposing holding elements 28 are brought into contact with each other.

In the area 33 which follows the area 32, the vertical speed of the rolling element 25 and therefore of the carriages 15 is increased, and the stored-goods carrier resting on the holding elements 27 is raised. The area 33 is followed by an area 34, over which the carriage is transported away from the horizontal conveyor device toward the vertical conveyor device at maximum vertical speed.

Then, in an area 35 of the circulation path 29, the vertical speed of the rolling element 25 is braked to a vertical speed just below the vertical speed of the vertical conveyor device. The cycle then begins from the start again.

The function described by using FIG. 6 applies equally to the upper and lower transfer devices 10, 11. The movement can be reversed by reversing the direction of circulation of the rolling elements 25. In addition, instead of the mechanical control of the acceleration via a gear mechanism, direct electronic control of the drive means (not shown) may be carried out.

In the upper transfer devices, the holding elements 27 fold away (not shown) during the transfer of stored-goods carriers to the vertical conveyor device and during the placement of the stored-goods carriers 5 on the storage column, so that the opposing holding elements 28 can pass by the holding elements 27. Conversely, the holding elements fold forward as the stored-goods carriers are raised out of the storage columns, before the stored-goods carriers are picked up.

In the following text, the construction of the vertical conveyor device 7 will be described using FIG. 7A. Here, the same reference symbols as used in the preceding drawings will again be used for the same components.

Figures 7A, 7B:
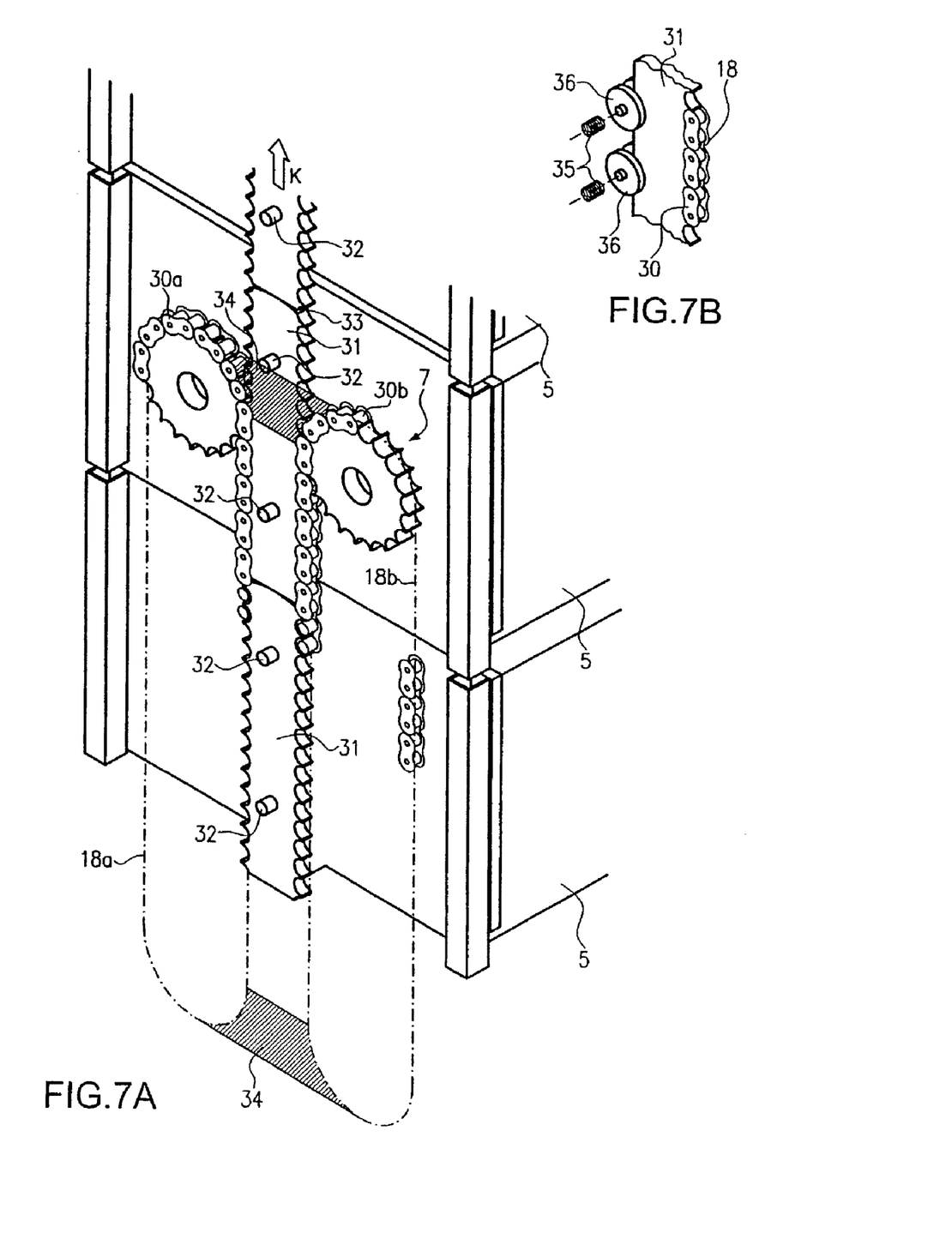
FIG. 7A shows a perspective detail view of FIG. 4, a vertical conveyor device being illustrated.
FIG. 7B shows a perspective illustration of an alternative to the configuration shown in FIG. 7A.

In the exemplary embodiment of FIG. 7A, each vertical conveyor device 7 has two flexible drive mechanisms 18*b* driven in opposite directions, each having a flexible drive 30*a* and 30*b*. In the exemplary embodiment of FIG. 7A, the flexible drives are configured as chains, but toothed belts can alternatively also be used. The two flexible drives 18*a*, 18*b* are arranged beside each other, so that the two opposite sections of the flexible drives 30*a*, 30*b* move in the same direction, for example in the direction of the arrow K.

On each side wall of the stored-goods carriers 5 there is a rack 31, which can be brought into engagement with the two opposite sections of the flexible drives 18*a*, 18*b*. As a result of the engagement between the rack 31 and the flexible drives 18, the stored-goods carriers 5 are transported in the vertical direction with the movement of the flexible drive.

Since the stored-goods carriers 5 of a storage column 4 rest on one another in the manner of a stack, for the vertical transport of the storage column it is merely necessary for the connection between the vertical conveyor device 7 and the stored-goods carriers 5 to take place on the lowest or the two lowest stored-goods carriers.

At least one end 33 of the rack 31 is configured in such a way that coupling the rack 31 of the stored-goods carrier 5 into the vertical conveyor device 7 is made easier. In particular, the end of the rack 31 can be spherical or chamfered or beveled.

Coupling is achieved by in each case a stored-goods carrier being transported up with its racks into a transfer area 34 between the flexible drives 18*a*, 18*b*, in the transport direction K and at a vertical speed equal to or just below the vertical speed of the vertical conveyor device 7, by means of a transfer device 10, 11. The rack 31 automatically engages in the flexible drive 26, and the vertical conveyor device raises the stored-goods carrier off the transfer device.

As an alternative to the rack 31 configured on both sides with two opposite flexible drive mechanisms 18*a*, 18*b*, use can also be made of only a single flexible drive means 18 with a rack 31 toothed on one side, as illustrated in FIG. 7B. In this case, opposite the rack 31, it is necessary to use rollers 36 or other sliding elements pressed against the rack 31 by force generators 35, in order to maintain the engagement between flexible drive 30 and rack 31.

Figure 8:
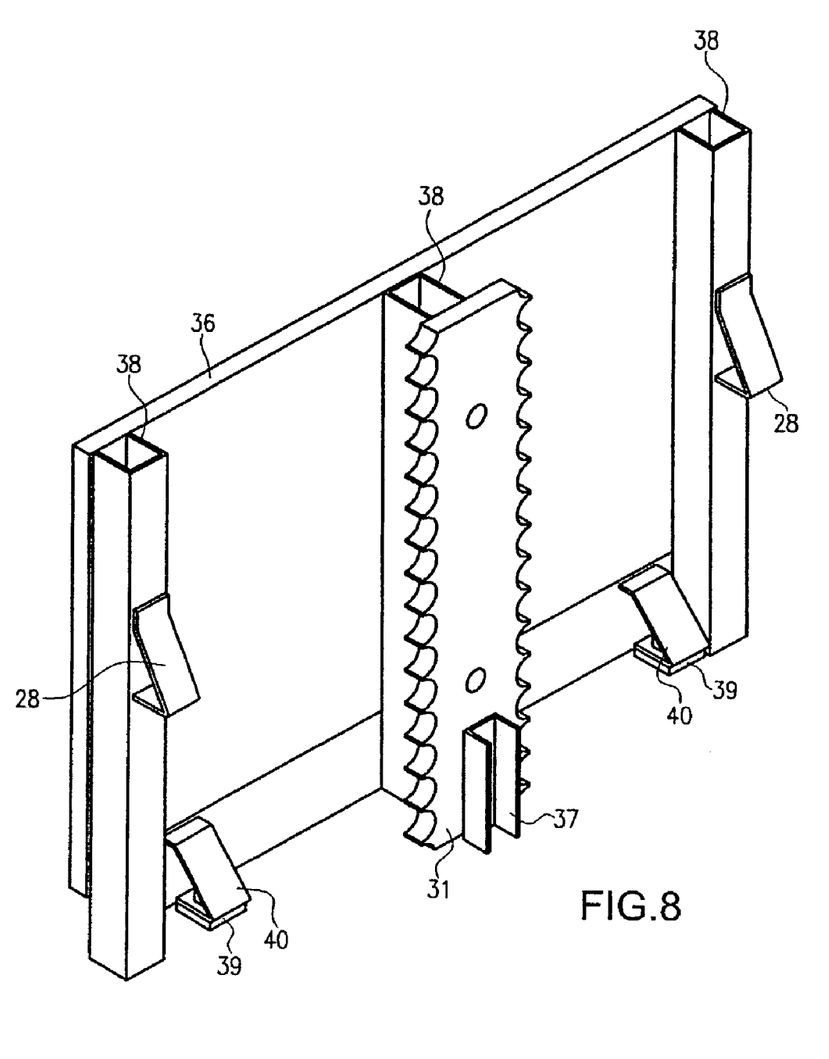
FIG. 8 shows a perspective detail view of a side section of a stored-goods carrier.

The construction of a side wall 36 of a stored-goods carrier 5 will now be described by using FIG. 8.

On the side wall of the stored-goods carrier 5, in addition to the rack 31 and the opposing holding elements 28, further devices made of bent steel sheet are provided:

A driver holder 37 configured as a U profile running in the vertical direction is fitted to the rack and accommodates the finger-like drivers 12 of the horizontal conveyor devices 8, 9.

Steel struts 38 running vertically stiffen the side wall 36 of the stored-goods carriers. Within a storage column, the stored-goods carriers come to rest on one another on the steel struts, so that no loads are introduced into the stored-goods carrier itself.

In addition, each side wall of a stored-goods carrier 5 is provided with sliding shoes 39, on which the stored-goods carrier 5 slides along the sliding rail 13 of the horizontal conveyor devices. For this purpose, the sliding shoes are provided with an intermediate layer 40 which is produced from a material with a low coefficient of friction when paired with the material of the sliding rail.

Figures 9A, 9B:
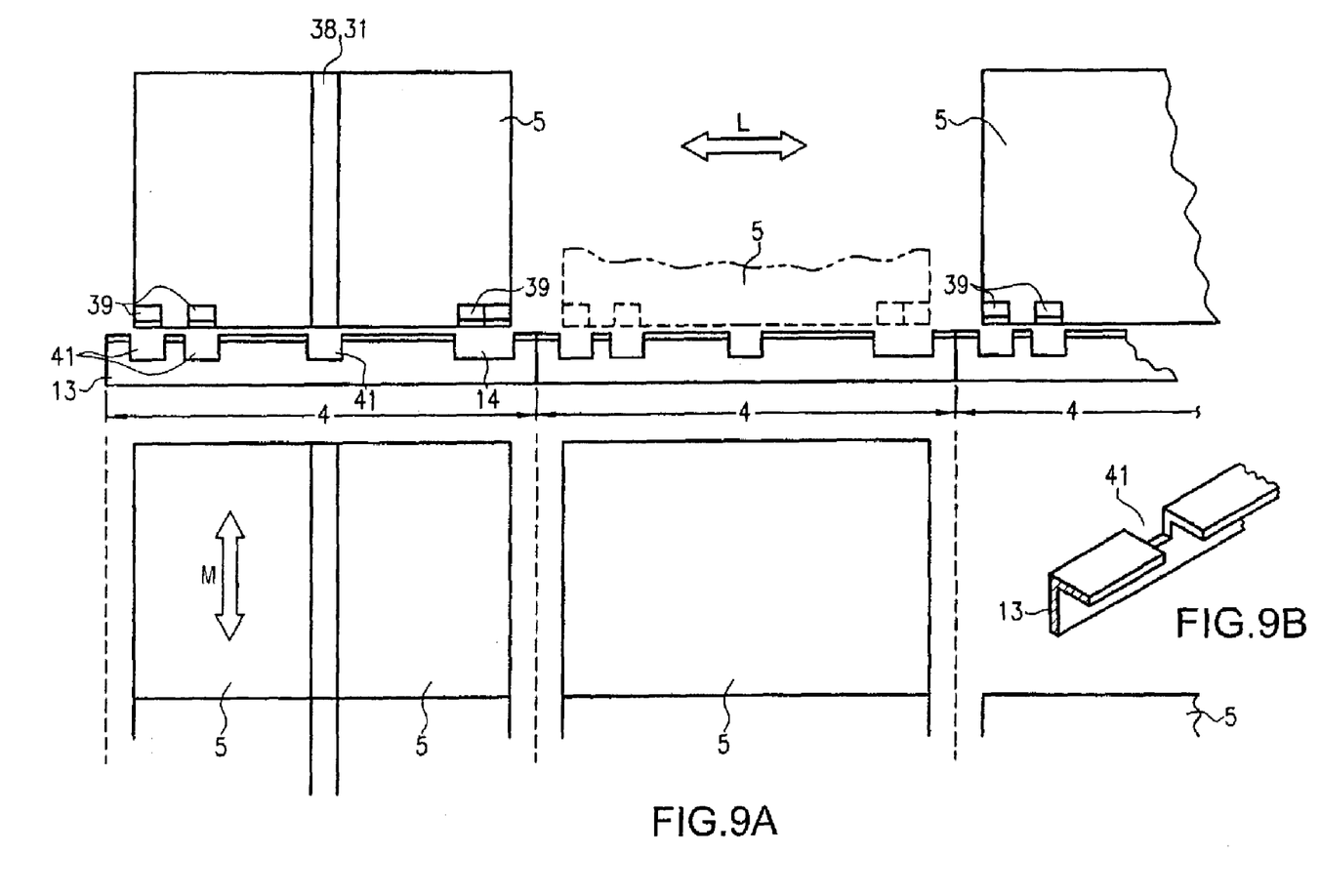
FIG. 9A shows a schematic illustration to explain the function of the horizontal conveyor device.
FIG. 9B shows a detail from FIG. 9A.

FIG. 9A shows how, by means of the special arrangement of the sliding shoes and cutouts on the sliding rail 13, the stored-goods carriers 5 can be moved from the upper horizontal conveyor devices 9 to the upper transfer devices 11 and vice versa only at predefined positions.

The upper sliding rails of the upper horizontal conveyor devices 9 are provided with cutouts 41 in the area of a storage column 4 in each case. The cutouts are arranged in such a way that the sliding shoes 39 and the holding elements 28 and the struts 38 can be transported past the sliding rail 13 only when the stored-goods carrier 5 is aligned with the storage column 4.

As can be seen in FIG. 9B, the sliding rail 13 has a substantially L-shaped profile, and the cutouts extend substantially over the horizontal area.

The invention claimed is:

1. A circulating storage system comprising:
   more than two storage columns of stored-goods carriers, said stored-goods carriers being arranged one above the other in said more than two storage columns,
   a plurality of upper horizontal conveyor devices by means of which, during operation, said stored-goods carriers can be transferred from one storage column to an adjacent storage column above said more than two storage columns,
   a plurality of lower horizontal conveyor devices by means of which, during operation, said stored-goods carriers can be transferred from one storage column to an adjacent storage column beneath said more than two storage columns,
   a plurality of vertical conveyor devices by means of which, during operation, at least part of said more than two storage columns can be moved in the vertical direction, each vertical conveyor device of said plurality of vertical conveyor devices being assigned to one of said more than two storage columns,
   wherein each storage column can be moved in the vertical direction, independently of the other storage columns, by the vertical conveyor device assigned to it, and can be synchronized to the movement of said upper and lower horizontal conveyor devices to allow various circulation paths of said stored-goods carriers, said various circulation paths including any of said more than two storage columns.

2. The circulating storage system (1) as claimed in claim 1, wherein the stored-goods carriers (5) of a storage column (4) are supported substantially in the manner of a stack on a lower stored-goods carrier which is in engagement with one of the vertical conveyor device (7).

3. The circulating storage system (1) as claimed in claim 1, wherein each of the vertical conveyor device (7) comprises at least one flexible drive mechanism (18).

4. The circulating storage system (1) as claimed in claim 3, wherein each of the vertical conveyor device (7) comprises two flexible drive mechanisms (18a, 18b) running in opposite directions.

5. The circulating storage system (1) as claimed in claim 1, wherein the stored-goods carriers (5) are provided with a coupling section (31) which can be coupled into one of the vertical conveyor device (7) during the circulation of the stored-goods carriers (5).

6. The circulating storage system (1) as claimed in claim 5, wherein the coupling section (31) is configured as a rack (31) that can be brought into engagement with a chain drive (18).

7. The circulating storage system (1) as claimed in claim 1, wherein the vertical conveyor devices (7) are arranged in the lower area of the storage column (4).

8. The circulating storage system (1) as claimed in claim 1, wherein a separately controllable horizontal conveyor device (8, 9) is provided in each case at the upper and at the lower end of a storage column (4).

9. The circulating storage system (1) as claimed in claim 1, wherein the horizontal conveyor device (8, 9) comprises a sliding rail (13) that extends substantially in the horizontal direction and on which a sliding section (39) of the stored-goods carriers (5) is supported in a sliding manner when being transported from one storage column (4) to the other.

10. The circulating storage system (1) as claimed in claim 9, wherein the sliding rail (13) of the upper horizontal conveyor device (9) has cutouts (41) in the area of each storage column (4), which cutouts act together with projections (28, 38, 39) on the stored-goods carriers and permit the stored-goods carriers to be removed only at predetermined positions relative to the storage columns (4).

11. The circulating storage system (1) as claimed in claim 1, wherein at least one transfer device (10, 11) is provided for each storage column (4), is arranged between the horizontal conveyor device (8, 9) of this storage column (4) and the vertical conveyor device (7) of this storage column (4) and by means of which the stored-goods carriers (5) can be transferred from the horizontal conveyor device (8, 9) to the vertical conveyor device (7).

12. The circulating storage system (1) as claimed in claim 11, wherein each storage column (4) is assigned at least an upper (10) and a lower (11) transfer device.

13. The circulating storage system (1) as claimed in claim 12, wherein the transfer device (10, 11) forms a cam drive (14, 15, 16, 22, 23, 25).

14. The circulating storage system (1) as claimed in claim 13, wherein the cam drive (14, 15, 16, 22, 23, 25) comprises a flexible drive mechanism (14).

15. The circulating storage system (1) as claimed in claim 11, wherein the transfer device (10, 11) forms a cam drive (14, 15, 16, 22, 23, 25).

16. The circulating storage system (1) as claimed in claim 15, wherein the cam drive (14, 15, 16, 22, 23, 25) comprises a flexible drive mechanism (14).

17. The circulating storage system as claimed in claim 1, wherein said plurality of upper and lower horizontal and vertical conveyor devices can be moved independently of each other, allowing multiple simultaneous circulation of said stored-goods carriers.

18. A construction set for building up a modularly expandable circulating storage system, said construction set comprising:
- a plurality of substantially identical storage column modules, which can be built one against the other, each of said plurality of substantially identical storage column modules being formed by one storage column, and comprising a vertical conveyor device assigned to said storage column,
- a plurality of upper horizontal conveyor devices, each adapted to bridge a pair of adjacent storage column modules,
- a plurality of lower horizontal conveyor devices, each adapted to bridge a pair of adjacent storage column modules,
- said construction set including at least three said storage columns and being arranged such that one said upper horizontal conveyor device and one said lower horizontal conveyor device are disposed between each adjacent pair of said storage columns,
- wherein said plurality of upper and lower horizontal conveyor devices can be connected to said plurality of storage column modules to form various circulation paths.

19. The construction set as claimed in claim 18, wherein said storage column module further comprises at least one transfer device for each of said storage columns, by means of which transfer device said stored-goods carriers can be transferred in operation from one said upper and lower transfer device to said vertical conveyor device.

20. A circulating storage system comprising:
- more than two storage columns of stored-goods carriers, said stored-goods carriers being arranged one above the other in each of said more than two storage columns,
- a plurality of upper horizontal conveyor devices by means of which, during operation, said stored-goods carriers can be transferred from one storage column to an adjacent storage column above said more than two storage columns,
- a plurality of lower horizontal conveyor devices by means of which, during operation, said stored-goods carriers can be transferred from one storage column to an adjacent storage column below said more than two storage columns,
- a plurality of vertical conveyor devices by means of which, during operation, at least part of said more than two storage columns can be moved in the vertical direction, each vertical conveyor device of said plurality of vertical conveyor devices being assigned to one of said more than two storage columns,
- wherein each said storage column can be moved in the vertical direction, independently of the other said storage columns, by the vertical conveyor device assigned to it, and wherein at least two transfer devices are provided for each said storage column, at least one said transfer device being arranged between said upper horizontal conveyor device of said storage column, at least one other said transfer device being arranged between said upper horizontal conveyor device and said vertical conveyor device of said storage columns, and wherein, by means of said at least one transfer device, said stored-goods carriers, in operation, can be transferred from said upper or lower horizontal conveyor device to said vertical conveyor device.

21. The circulating storage system as claimed in claim 20, wherein said plurality of upper and lower horizontal and vertical conveyor devices can be moved independently of each other, allowing multiple simultaneous circulation of said stored-goods carriers.

22. The circulating storage system as claimed in claim 20, wherein said at least one transfer device is arranged at one of an upper and lower end of one of said storage columns.

23. The circulating storage system as claimed in claim 20, wherein said circulating storage system is built up modularly expandable by a plurality of storage column modules, said storage column modules being bridged by said plurality of upper and lower horizontal conveyor devices.

24. The circulating storage system as claimed in claim 20, wherein said circulating storage system is built up modularly expandable by a plurality of storage column modules, said storage column modules being formed by a storage column and a vertical conveyor device assigned to said storage column.

25. The circulating storage system as claimed in claim 20, wherein each of said upper and lower horizontal devices, and each of said vertical conveyor devices, is adapted to be independently movable of each other.

26. A circulating storage system comprising:
- a plurality of at least three storage columns of stored-goods carriers, said stored-goods carriers being arranged one above the other in said plurality of storage columns,
- a plurality of connected upper horizontal conveyor devices by means of which, during operation, said stored-goods carriers can be transferred from one storage column to another storage column above said plurality of storage columns,
- a plurality of connected lower horizontal conveyor devices by means of which, during operation, said stored-goods carriers can be transferred from one storage column to the other storage column beneath said plurality of storage columns,
- a plurality of vertical conveyor devices by means of which, during operation, at least part of said plurality of storage columns can be moved in the vertical direction, each vertical conveyor device of said plurality of vertical conveyor devices being assigned to one of said plurality of storage columns,
- wherein each of said plurality of upper horizontal conveyor devices is assigned to a different pair of said plurality of storage columns, and each of said plurality of lower horizontal conveyor devices is assigned to a pair of said plurality of storage columns,
- said system being arranged such that one said upper horizontal conveyor device and one said lower horizontal conveyor device are disposed between each adjacent pair of said storage columns.

27. The circulating storage system as claimed in claim 26, wherein said plurality of upper and lower horizontal and vertical conveyor devices can be moved independently of each other, allowing multiple simultaneous circulation of said stored-goods carriers.

28. The circulating storage system as claimed in claim 26, wherein at least one transfer device is provided for each storage column, said at least one transfer device being arranged between said upper or lower horizontal conveyor device of said storage column, and wherein, by means of said at least one transfer device, said stored-goods carriers, in operation, can be transferred from said upper or lower horizontal conveyor device to said vertical conveyor device.

29. The circulating storage system as claimed in claim 28, wherein each of said storage columns is assigned at least an upper and lower transfer device.

30. The circulating storage system as claimed in claim 28, wherein said at least one transfer device is arranged at one of an upper and lower end of a storage column.

31. The circulating storage system as claimed in claim 26, wherein said circulating storage system is built up modularly expandable by a plurality of storage column modules, said storage column modules being bridged by said plurality of upper and lower horizontal conveyor devices.

32. The circulating storage system as claimed in claim 26, wherein said circulating storage system is built up modularly expandable by a plurality of storage column modules, said storage column modules being formed by a storage column and a vertical conveyor device assigned to said storage column.

33. The circulating storage system as claimed in claim 32, wherein said storage column modules comprise two transfer devices assigned to a storage column, said transfer devices, in operation, transferring said stored-goods carriers from said upper or lower horizontal conveyor device to said vertical conveyor device.

34. The circulating storage system as claimed in claim 26, wherein each of said upper and lower horizontal devices, and each of said vertical conveyor devices, is adapted to be independently movable of each other.

35. A circulating storage system comprising:
- a plurality of at least three storage columns of stored-goods carriers, said stored-goods carriers being arranged one above the other in said plurality of storage columns,
- a plurality of upper horizontal conveyor devices by means of which, during operation, said stored-goods carriers can be transferred from one storage column to the other storage column above said plurality of storage columns,
- a plurality of lower horizontal conveyor devices by means of which, during operation, said stored-goods carriers can be transferred from one storage column to the other storage column beneath said plurality of storage columns,
- a plurality of vertical conveyor devices by means of which, during operation, at least part of said plurality of storage columns can be moved in the vertical direction, each vertical conveyor device of said plurality of vertical conveyor devices being assigned to one of said plurality of storage columns, wherein, in operation, said plurality of said upper horizontal conveyor devices, said plurality of said lower horizontal conveyor devices, and said plurality of said vertical conveyor devices cooperate to circulate said stored-goods carriers through said circulating storage system simultaneously along multiple circulation paths, said system being arranged such that one said upper horizontal conveyor device and one said lower horizontal conveyor device are disposed between each adjacent pair of said storage columns.

36. The circulating storage system as claimed in claim 35, wherein said circulating storage system is modularly expandable in that said storage columns are designed as storage column modules that may be added individually.

37. The circulating storage system as claimed in claim 35, wherein said upper horizontal conveyor devices are designed as conveyor modules that may be added individually to said storage system.

38. The circulating storage system as claimed in claim 35, wherein said lower horizontal conveyor devices are designed as conveyor modules that may be added individually to said storage system.

39. The circulating storage system as claimed in claim 35, wherein said storage column modules comprise at least one upper horizontal conveyor device connecting to an upper horizontal conveyor device of another storage column module.

40. The circulating storage system as claimed in claim 35, wherein said storage column modules comprise at least one lower horizontal conveyor device connecting to a lower horizontal conveyor device of another storage column module.

41. The circulating storage system as claimed in claim 35, wherein said upper horizontal conveyor devices connect from one storage column module to an adjacent storage column module.

42. The circulating storage system as claimed in claim 35, wherein said lower horizontal conveyor devices connect from one storage column module to an adjacent storage column module.

* * * * *

UNITED STATES PATENT AND TRADEMARK OFFICE
CERTIFICATE OF CORRECTION

PATENT NO. : 7,210,889 B2  Page 1 of 1
APPLICATION NO. : 10/319964
DATED : May 1, 2007
INVENTOR(S) : John McFarland It is certified that error appears in the above-identified patent and that said Letters Patent is hereby corrected as shown below:

Col. 12, Line 3;
Col. 12, Line 5;
Col. 12, Line 8; and
Col. 12, Line 14:

Delete "device (7)", and substitute --devices (7)--.

Signed and Sealed this

Twenty-sixth Day of June, 2007

JON W. DUDAS
*Director of the United States Patent and Trademark Office*